(12) United States Patent
Claxton

(10) Patent No.: US 7,552,763 B2
(45) Date of Patent: Jun. 30, 2009

(54) SPHERE LAUNCHER

(75) Inventor: Dannie Claxton, Beccles (GB)

(73) Assignee: Claxton Engineering Services Limited, Great Yarmouth (GB)

( * ) Notice: Subject to any disclaimer, the term of this patent is extended or adjusted under 35 U.S.C. 154(b) by 0 days.

(21) Appl. No.: 11/832,113

(22) Filed: Aug. 1, 2007

(65) Prior Publication Data

US 2008/0029262 A1 Feb. 7, 2008

(51) Int. Cl.
*E21B 33/13* (2006.01)
(52) U.S. Cl. .................... 166/75.15; 166/70
(58) Field of Classification Search ............. 166/75.15, 166/70
See application file for complete search history.

(56) References Cited

U.S. PATENT DOCUMENTS

| 3,035,640 | A | * | 5/1962 | Gibson et al. ................. 166/70 |
| 3,039,531 | A | * | 6/1962 | Scott ............................ 166/70 |
| 3,076,509 | A | * | 2/1963 | Burns et al. ................... 166/70 |
| 3,216,500 | A | * | 11/1965 | Diehl ........................... 166/70 |
| 3,218,659 | A | * | 11/1965 | Rowley ................... 15/104.061 |
| 3,444,928 | A | * | 5/1969 | Pitts ............................ 166/70 |
| 4,132,243 | A | * | 1/1979 | Kuus ........................... 137/268 |
| 4,491,177 | A | * | 1/1985 | Baugh ...................... 166/75.15 |
| 4,694,900 | A | * | 9/1987 | Behrens .................... 166/75.15 |
| 4,917,184 | A | * | 4/1990 | Freeman et al. ............. 166/285 |
| 5,709,266 | A | | 1/1998 | Kruse |
| 6,588,501 | B1 | | 7/2003 | Boyadjieff |
| 7,055,611 | B2 | * | 6/2006 | Pedersen et al. ............ 166/386 |
| 2003/0141052 | A1 | * | 7/2003 | Pedersen et al. .............. 166/70 |
| 2003/0155115 | A1 | * | 8/2003 | Pedersen et al. ......... 166/75.15 |
| 2004/0055741 | A1 | * | 3/2004 | Pedersen et al. .............. 166/70 |
| 2005/0184083 | A1 | | 8/2005 | Diaz et al. |

FOREIGN PATENT DOCUMENTS

WO    WO 03 071093    8/2003

* cited by examiner

*Primary Examiner*—David J Bagnell
*Assistant Examiner*—Cathleen R Hutchins
(74) *Attorney, Agent, or Firm*—Bourque and Associates, PA

(57) ABSTRACT

The present invention provides an apparatus for launching spheres into a gas riser in order to reduce the risk that the output from the riser is lost. The apparatus comprises a rotatable body that is rotated to a first position to receive an object from an object storage means in an aperture and the rotatable body is then rotated to a second position such that the object received in the aperture is received within a riser.

10 Claims, 6 Drawing Sheets

SPHERE LAUNCHER

BACKGROUND a. Field of the Invention

The invention relates to an apparatus for launching a series of spheres and in particular to an apparatus for launching a series of spheres into a gas producing well.

b. Related Art

It is a widely accepted understanding that with aged wells, or in some circumstances due to well bore formation on gas wells, production may be problematic or cease totally. Typically, this is due to the well bore formation which has a high ingress of fluids, for example water, which chokes the well bore. The volume of the well bore produced fluids can create a greater hydrostatic pressure acting on the well bore and be greater than the pressure of the produced gas. This can lead to loss or failure of the producing section of the well bore.

It is also known to that to solve the problem, it is necessary to reduce the effects of the well bore produced fluids by isolating the fluid producing section of the reservoir or lifting the fluid to allow production. One method to isolate the water producing section of the reservoir is through the introduction of spheres which are heavier than the well bore fluids, which act to reduce the well bore cross-sectional area and limit the rate of water ingress into the well bore. The spheres will produce a honeycomb effect within the well bore and help to maintain a higher gas pressure, thus allowing gas production through the honeycomb of spheres. Some systems for introducing these spheres are commercially available but these have a number of disadvantages, the most important of which are that the size of sphere that can be used is limited and the loading of the spheres into the systems can take a considerable period of time.

SUMMARY OF THE INVENTION

According to a first aspect of the present invention there is provided an apparatus for providing a supply of objects to a riser, the apparatus comprising a rotatable body, such that, in use the rotatable body is rotated to a first position to receive an object from an object storage means in an aperture and the rotatable body is then rotated to a second position such that the object received in the aperture is received within a riser.

The invention allows a consistent supply to be provided to the riser, with the rate at which the spheres are supplied being determined by the number of apertures in the rotatable body and the speed that the body is rotated at.

Preferably, the first position is vertically aligned with the second position. The rotatable body may comprise two apertures.

The apparatus preferably further comprises an object storage means configured to supply objects to the rotatable body. The object storage may comprise means for pressure sealing the storage means and preferably further comprises means for pressurising the apparatus to substantially the same pressure as the riser.

The storage means is preferably a wireline lubricator that can store enough objects for continuous operation in excess of two hours. Such a storage means can be changed relatively quickly and easily, with a minimal impact on operational timings.

The rotatable body is received within a housing and may be rotatably mounted on an axle, the rotatable body further comprising one or more sealing means received around the axle. The drive means may be received outside the housing and mounted on the housing. The object storage means may be received outside the housing and the apparatus may further comprise a first connector for connecting the housing to the object storage means, the first connector being located vertically above the first position. The apparatus may also comprise a second connector for connecting the apparatus to a riser, the second connector being located vertically below the second position.

DETAILED DESCRIPTION

Figure 1:
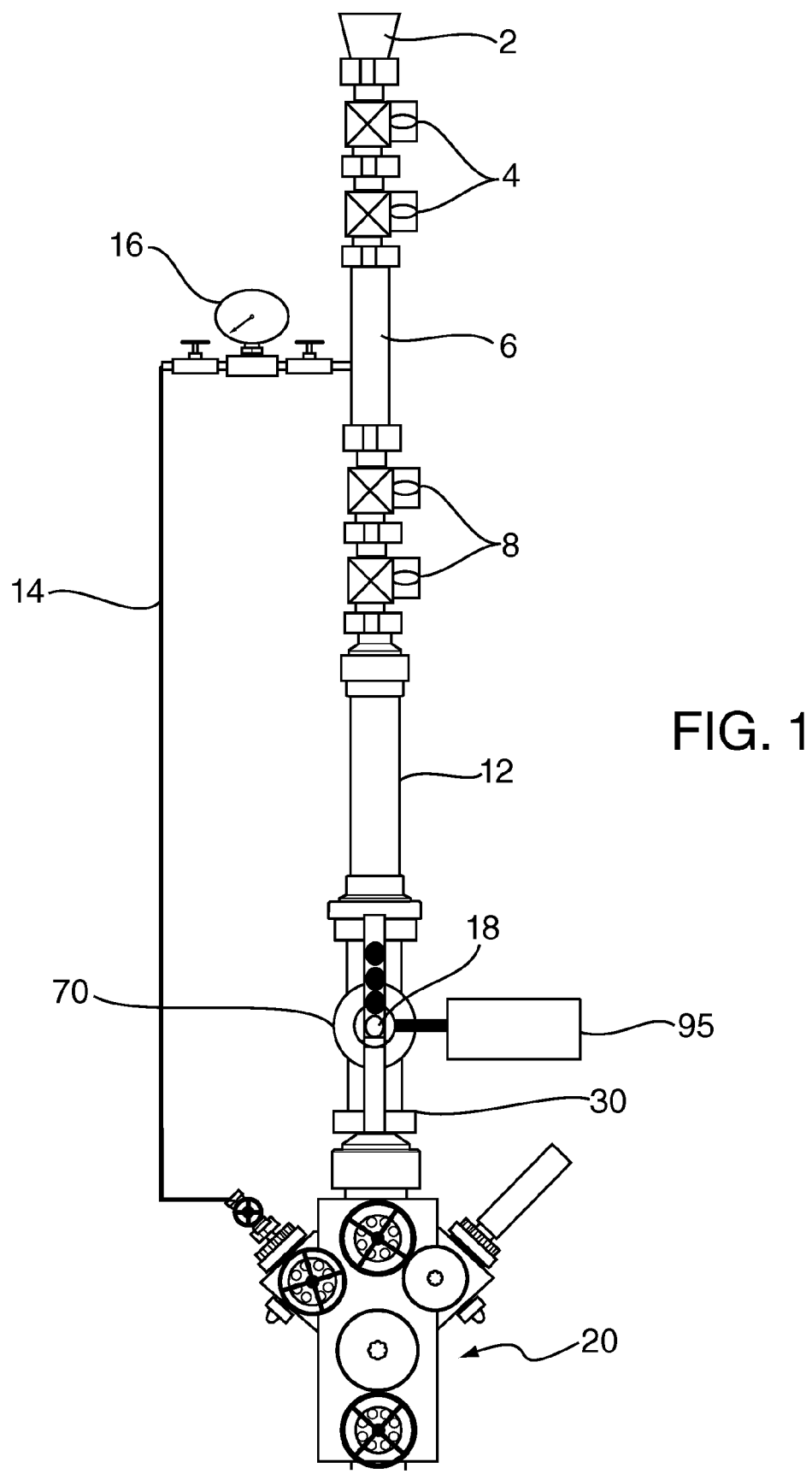
FIGS. 1, 1a and 1b show a schematic depiction of an apparatus according to the present invention.
Figure 1A:
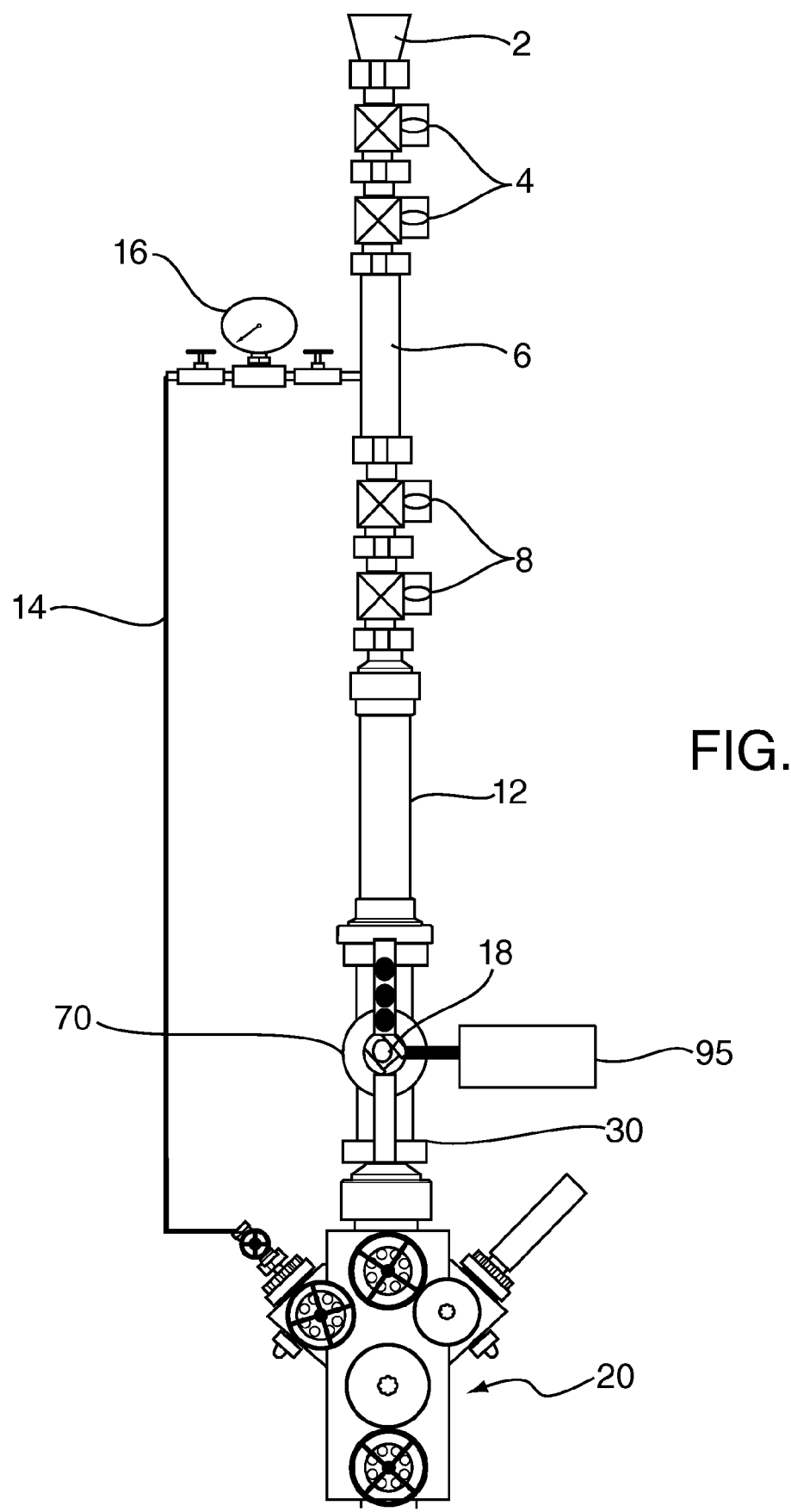
Figure 1B:
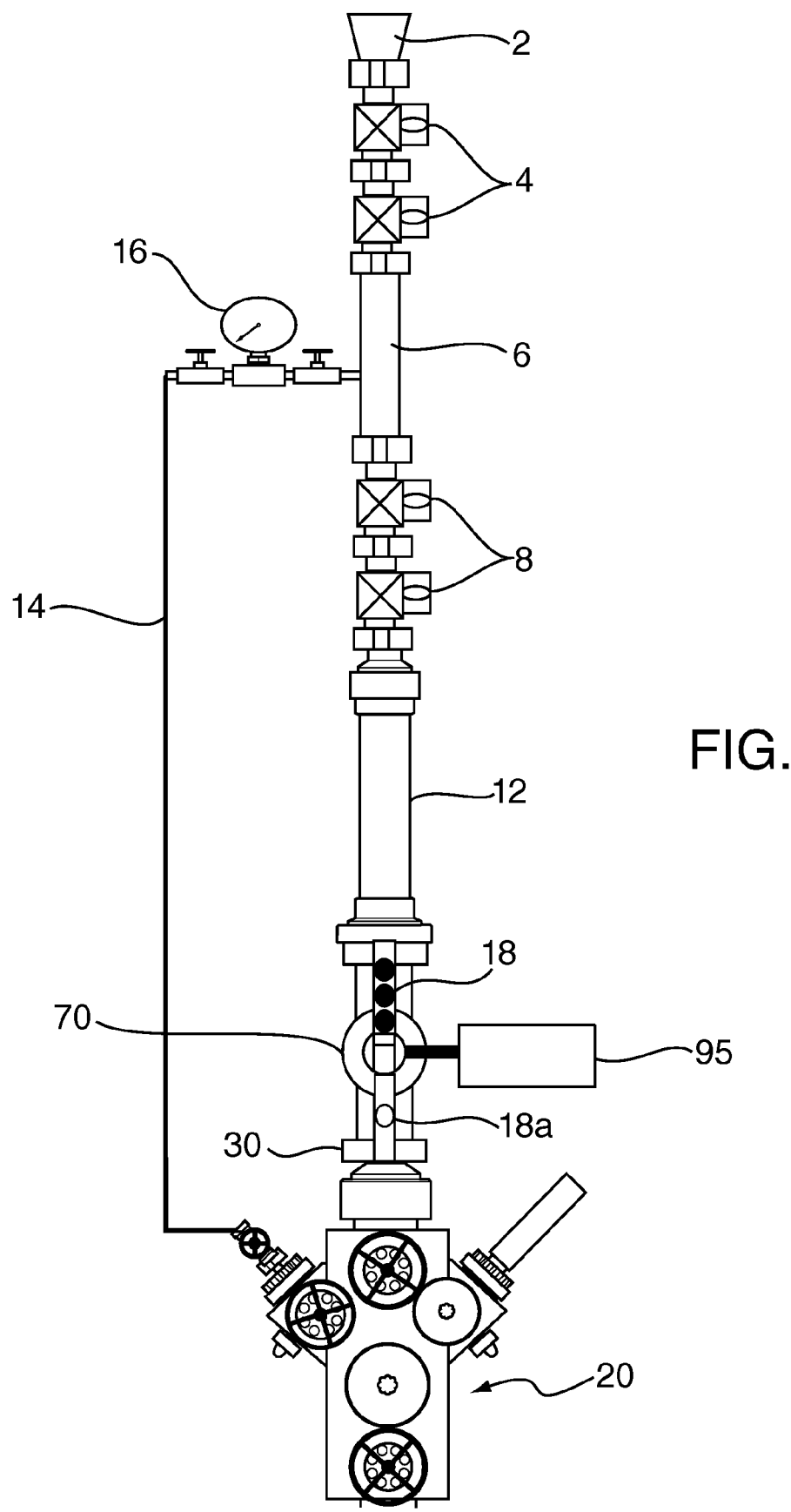

The invention will now be described, by way of example only, with reference to the Figures in which FIGS. 1, 1a & 1b show a schematic depiction of an apparatus 10 according to the present invention, the apparatus being coupled to a Christmas tree 20 that is coupled to the upper end of a riser (not shown) in a conventional manner. The apparatus 10 comprises a sphere launcher 30, which is coupled to the riser via a Christmas tree 20.

The apparatus comprises a loading hopper 2 that is separated from the first end of a sphere loading means 6 via first pressure isolation means 4. The second end of the sphere loading means 6 is connected to the first end of a sphere storage means 12 via second pressure isolation means 8. Spheres 18 that are held within the sphere storage means 12 can then pass into the sphere launcher 30. FIG. 1 shows that one of the spheres is held within the sphere dropper 70. The sphere dropper is rotatable (see below) such that only a single sphere is held within the sphere dropper (see FIG. 1a). As the sphere dropper is rotated further (see FIG. 1b), the sphere is dropped into the riser via the Christmas tree 20.

During the operation of the apparatus the sphere loading means and the sphere storage means are pressurised to the well pressure. This may be achieved by providing a pressure equalisation line 14 from the Christmas tree to the sphere loading means and appropriate control means 16 to regulate the pressure applied to the sphere loading means. The first pressure isolation means 4 enable spheres loaded from the sphere hopper to enter into the sphere loading means without losing pressure in the sphere loading means. Similarly, the second pressure isolation means enables the sphere loading means to be exposed to the external pressure whilst still maintaining the required pressure within the sphere storage means or the sphere dropper.

Figure 2A:
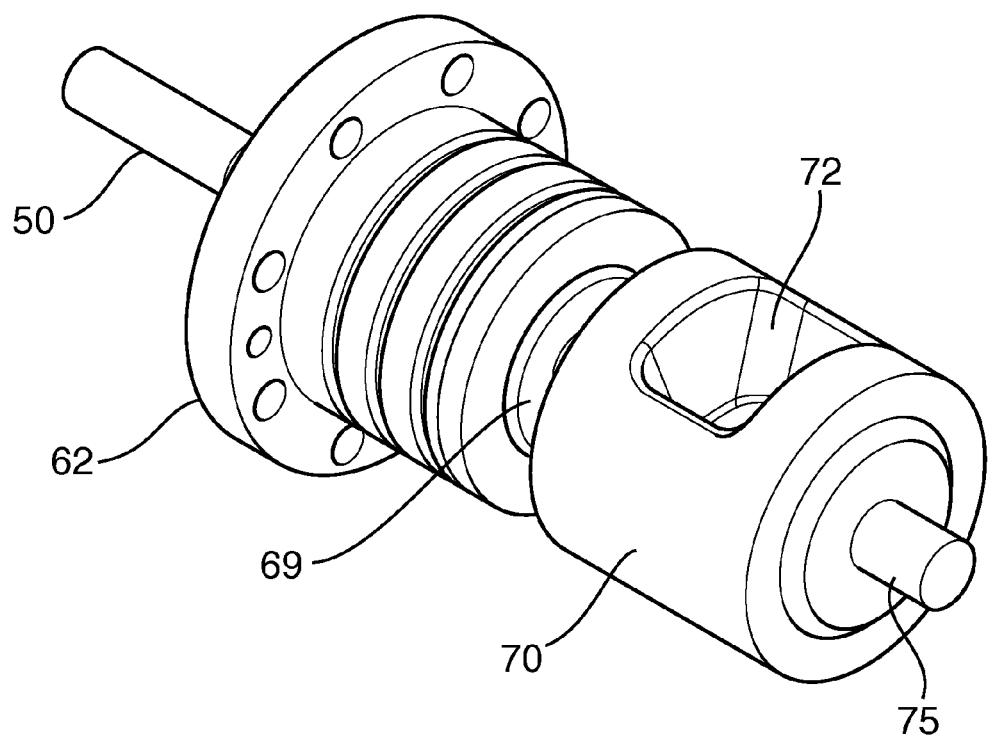
FIG. 2a shows a schematic depiction of a perspective view of the sphere launcher according to one embodiment of the invention.
Figure 2B:
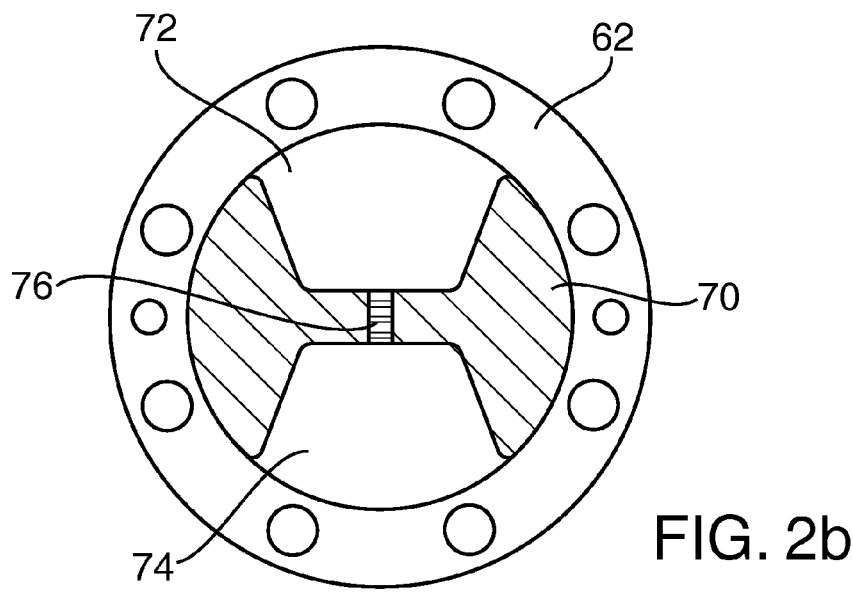
FIG. 2b shows a schematic depiction of a radial cross-section of the sphere launcher according to one embodiment of the invention.
Figure 2C:
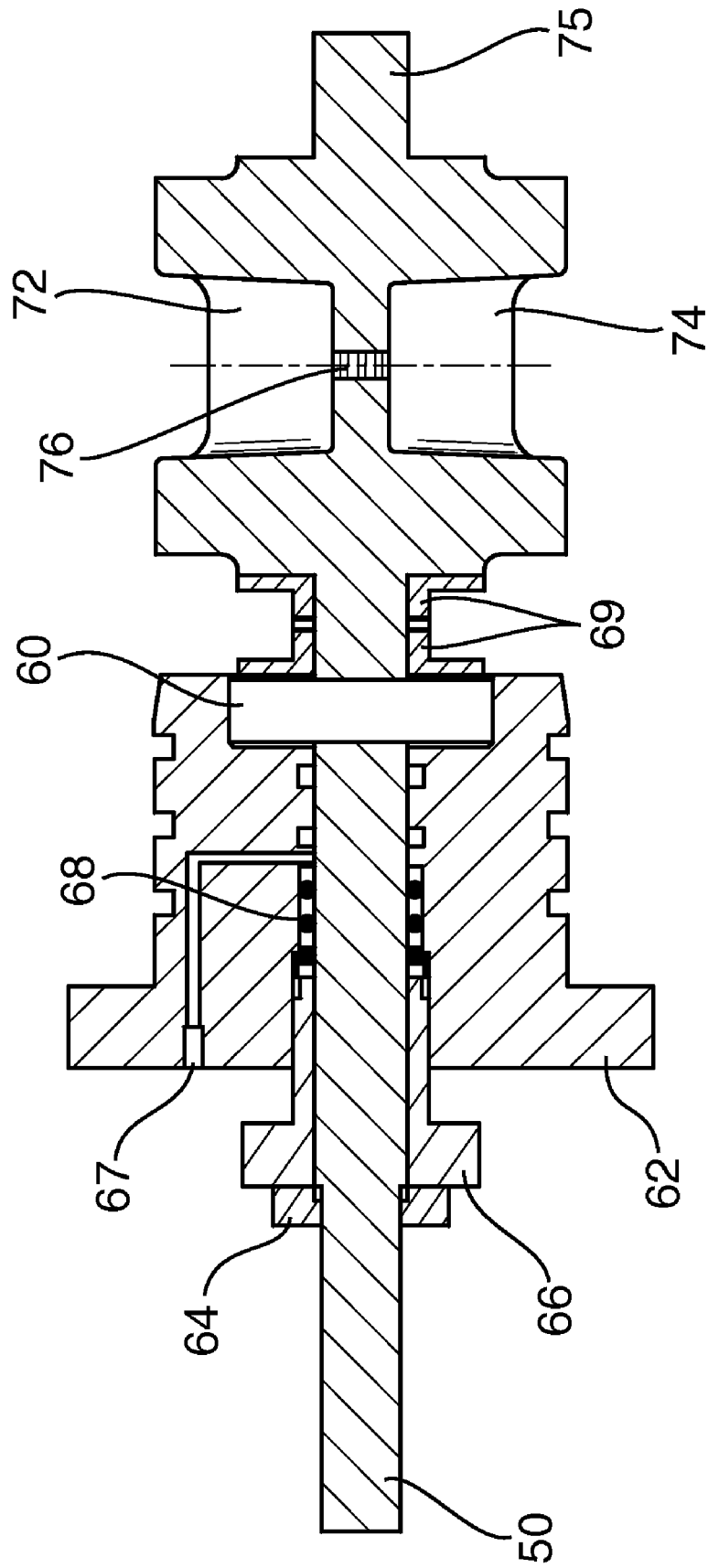
FIG. 2c shows a schematic depiction of an axial cross-section of the sphere launcher according to one embodiment of the invention.

FIGS. 2a, 2b and 2c show schematic depictions of a sphere launcher 30 according to one embodiment of the invention. FIG. 2a shows a perspective view of the sphere launcher, FIG. 2b shows a radial cross-section of the sphere launcher and FIG. 2c shows an axial cross-section of the sphere launcher. The sphere launcher 30 comprises an axle 50, bearing 60, bearing cap 62, locking means 64 & 66, sealant injection means 67, seal means 68, washers 69, and sphere dropper 70.

The sphere dropper 70 comprises first and second apertures 72, 74 and adjustment means 76.

The sphere dropper 70 is received on the bearing 60, which is coupled to the axle 50 such that when the axle is rotated, the bearing causes the sphere dropper to rotate. The sphere dropper 70, in use, is configured such that when the first aperture 72 is aligned with the aperture of the Christmas tree, the second aperture 74 is aligned with the sphere storage means 12. The second aperture will then receive a sphere from the sphere storage means 12 and a sphere received within the first aperture will move from the sphere dropper into the Christmas tree and then into the riser. The axle is coupled to a motor (not shown) that causes the sphere dropper to rotate. When the sphere dropper is rotated through 180° then the sphere received in the second aperture 74 will move into the riser, via the Christmas tree. Also, the first aperture is now aligned with the sphere storage means 12 and thus a further sphere will be received within the first aperture. The continued rotation of the sphere dropper 70 will cause the sphere launcher to provided a regular supply of spheres into the riser.

In order to avoid the well pressure from forcing the spheres back out of the riser, the sphere launcher and the sphere storage means are pressurised and comprise a pressure equalisation system to ensure that the apparatus provides a pressure that is equal to that of the well to avoid differential pressure acting on the spheres. Accordingly, the sphere launcher shown in FIG. 2 is received within a housing which is adapted to be securely connected to the bearing cap 62. Seal means 68 preferably comprise two sets of chevron seal stacks to seal the interior of the sphere launcher. The sphere launcher may also comprise sealant injection means 67, which is preferably a cross drilled injection port enabling the injection of plastic grease lubrication packing should a further method of sealing be required. The injection port may be provided between the two sets of chevron seal stacks or on the interior or exterior side of the chevron seal stacks.

In order to reduce the wear on the stem, chevron seal stacks and the bearing it is preferred to rotate the sphere dropper at a relatively low speed. In a preferred example, the sphere dropper is rotated once every 12 seconds, such that one sphere is dropped every 6 seconds. This also enables the spheres to be dropped into and from the sphere dropper without the sphere becoming fouled in the rotation of the sphere dropper.

Figure 3:
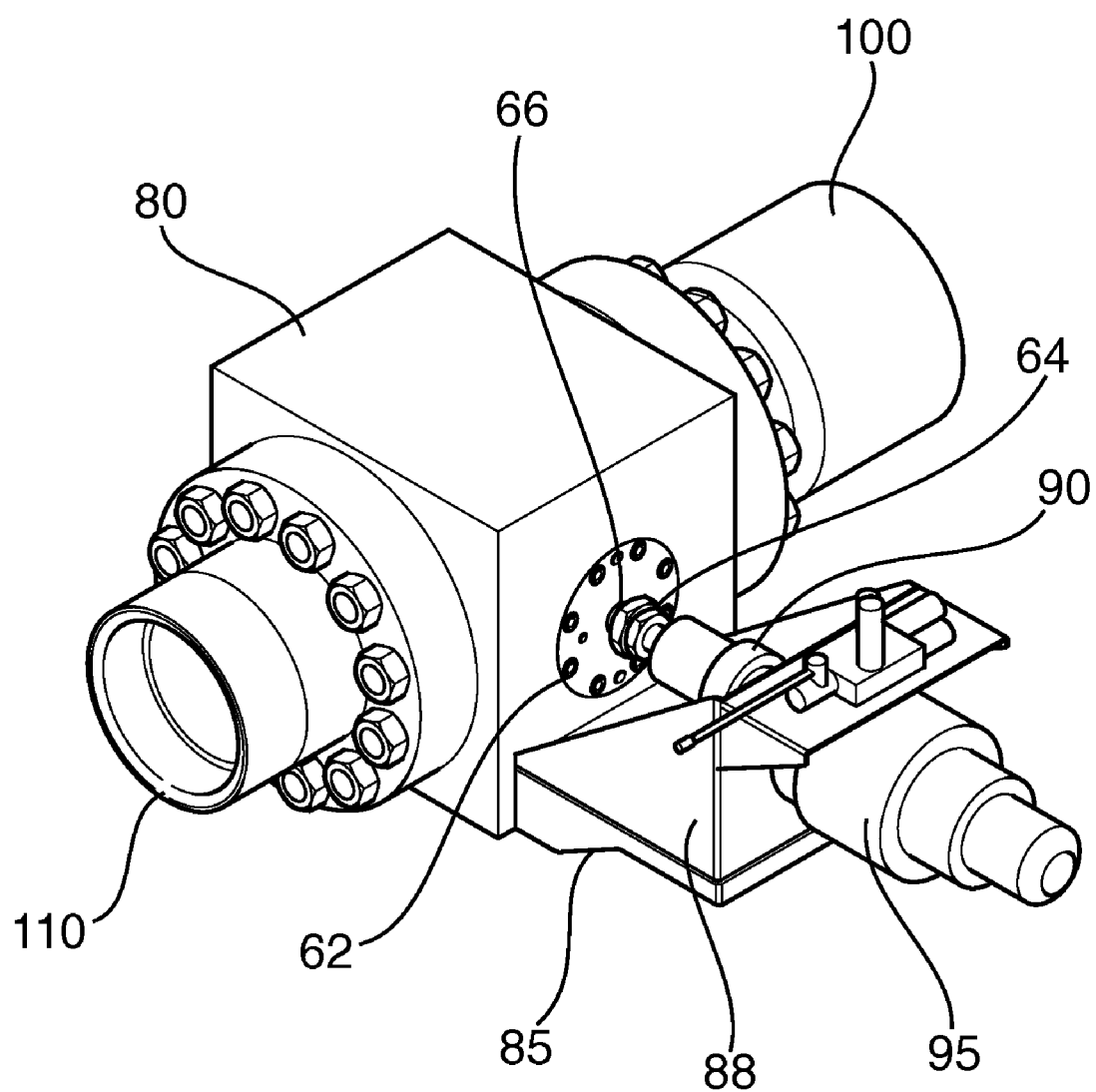
FIG. 3 shows a further schematic depiction of an axial cross-section of the sphere launcher.

FIG. 3 shows the sphere launcher described above with reference to FIG. 2 when received in a housing 80. The bearing cap 62 is secured to the housing conventional techniques and the axle stub 75 is supported within the housing such that it can be rotated. The free end of the axle 50 is received within a coupling 90 that is connected to a rotary drive means 95. Preferably the rotary drive means comprises a planetary gear box, geared to suit the rotational speed that the sphere launcher is rotated at, driven by a hydraulic motor that is fed from a pneumatically driven hydraulic pump unit. The rotation of the sphere launcher and the number of sphere drops can be recorded using a simple trip counter. A flange 85 to the housing 80 may be provided to support the coupling and the rotary drive means. Additional support means 88 may be provided to reinforce and stiffen the flange. The housing is preferably provided with conventional box 100 and pin 110 connections to allow the sphere launcher to be connected to the sphere storage means and the Christmas tree respectively. Preferably the axle stub is supported using a self lubricating thrust bearing arrangement and the other end of the sphere dropper is preferably supported in a similar manner to enable the free rotation of the sphere dropper with the weight of the sphere storage means from above.

It will be understood that in use the sphere launcher will be configured such that the box connection 110 is vertically upwards and the pin connection 100 is vertically downwards. The sphere dropper is received within the housing such that the apertures 72, 74 are aligned with the box and pin connections such that a sphere received from the sphere storage means will pass through into the Christmas tree.

The sphere storage means 12 preferably comprises a conventional wireline lubricator. For a 2 inch (50 mm) sphere, it has been found that it is possible to store 140 spheres per metre length of lubricator, enabling 1400 spheres to be stored in a conventional lubricator. At a dispensing rate of 1 sphere per 6 seconds this provides 140 minutes of operation per lubricator. The lubricator is pressurised to well pressure during operation and may be vented during refilling operations. The first and second pressure isolation means preferably comprise a double isolation valve. The internal diameter of the sphere storage means and the first and second pressure isolation means are preferably 63 mm (2.5 inches)

The spheres preferably have a 2 inch (50 mm) diameter and are made of a solid material that will not react with any of the materials found in the offshore environment and is suitably robust to avoid mechanical damage. It has been found that polypropylene is suitable for use. It will be understood that this does no preclude the use of other material for the spheres. The size of the spheres may also be altered dependent on the bore of the riser and the size of the apertures in the sphere dropper. It has been found that a 2 inch (50 mm) diameter sphere avoids fouling the dropper and provides a sufficient obstruction within the riser to provide the required increase in pressure. The rate at which the spheres are dropped into the riser may be varied as long as the risk of a sphere fouling in the sphere dropper is maintained at a suitable level. The sphere dropper may comprise one, two or more than two, aperture(s).

The invention claimed is:

1. An apparatus for providing a supply of objects to a riser, the apparatus comprising:
   an object storage device, configured for storing objects and for supplying objects to a rotatable body;
   the rotatable body having at least two apertures and coupled to said object storage device, such that, in use, the rotatable body is rotated to a first position to receive, in a first aperture, a first object from said object storage device, and wherein the rotatable body including said first object is then rotated to a second position such that the first object received in the first aperture is dispensed to a riser while simultaneously and automatically a second object from said object storage device is received in a second aperture of said rotatable body.

2. An apparatus according to claim 1, wherein the first position is aligned 180 degrees with the second position.

3. An apparatus according to claim 1, further including a first pressure apparatus, coupled to said object storage device, for pressure sealing the object storage device.

4. An apparatus according to claim 3, wherein the first pressure apparatus further comprises means for pressurising the apparatus to substantially a same pressure as in the riser.

5. An apparatus according to claim 1, wherein the rotatable body is received within a housing and is rotatably mounted on an axle, the rotatable body further comprising one or more sealing means received around the axle.

6. An apparatus according to claim 5, wherein the apparatus further comprises drive means coupled to said rotatable body, and wherein the drive means is disposed outside of and mounted on the housing.

7. An apparatus according to claim 5, wherein the apparatus further comprises the object storage device configured to supply the objects to the rotatable body, and further wherein the object storage device is received outside the housing and the apparatus further comprises a first connector for connecting the housing to the object storage device, the first connector being located vertically above the rotatable body.

8. An apparatus according to claim 1, wherein the apparatus comprises a second connector for connecting the apparatus to a riser, the second connector being located vertically below the rotatable body.

9. An apparatus for providing a supply of objects to a riser, the apparatus comprising:
   an object storage device, configured for storing objects and for supplying objects to a rotatable body;
   a first connector, coupled to said object storage device, for connecting the object storage device to the rotatable body;
   the rotatable body, received within a housing and rotatably mounted on an axle, the rotatable body further comprising one or more sealing means received around the axle; said rotatable body having at least two apertures and coupled to said object storage device; such that, in use, the rotatable body is rotated to a first position to receive, in a first aperture, a first object from said object storage device, and wherein the rotatable body including said first object is then rotated to a second position such that the first object received in the first aperture is dispensed to a riser while simultaneously and automatically a second object from said object storage device is received in a second aperture of said rotatable body; and
   a drive means, coupled to said rotatable body, for effectuating rotation of said rotatable body, and wherein said drive means is disposed outside of and mounted on said housing.

10. An apparatus for providing a supply of objects to a riser, the apparatus comprising:
   a loading hopper, disposed at ambient pressure, for holding a plurality of objects to be discharged into a well;
   a first pressure insulating device having a first coupling and a second coupling, said first coupling coupled to said loading hopper, said first pressure insulating device for allowing a first pressure at said first coupling and a second pressure at said second coupling;
   an object loading device, coupled proximate one end to said second coupling of said first pressure insulating device, for receiving objects from said loading hopper;
   a second pressure insulating device having a first coupling and a second coupling, said first coupling coupled to a second end of said object loading device, said second pressure insulating device for allowing a first pressure at said first coupling and a second pressure at said second coupling;
   an object storage device, having a first end and a second end, said first end coupled to said second coupling of said second pressure insulating device; said object storage device configured storing the plurality of objects and for supplying the plurality of objects to a rotatable body;
   the rotatable body, received within a housing and rotatably mounted on an axle, the rotatable body further comprising one or more sealing means received around the axle, said rotatable body having at least two apertures and coupled to said second end of said object storage device, such that, in use, the rotatable body is rotated to a first position to receive, in a first aperture, a first object from said object storage device, and wherein the rotatable body including said first object is then rotated to a second position such that the first object received in the first aperture is dispensed to a riser while simultaneously and automatically a second object from said object storage device is received in a second aperture of said rotatable body; and
   drive means, coupled to said rotatable body, for effectuating rotation of said rotatable body, and wherein said drive means is disposed outside of said housing.

* * * * *